United States Patent [19]

Collins

[11] 4,165,054

[45] Aug. 21, 1979

[54] COMFORT LOCK MECHANISM

[75] Inventor: Cecil A. Collins, Pontiac, Mich.

[73] Assignee: Fisher Corporation, Troy, Mich.

[21] Appl. No.: 902,732

[22] Filed: May 3, 1978

[51] Int. Cl.² ............... A62B 35/00; B65H 75/48
[52] U.S. Cl. ........................................... 242/107.7
[58] Field of Search ... 242/107.7, 107.6, 107.4 R–107.4 E, 242/107.12; 267/160; 280/744–747; 274/1 A; 74/569, 577 R–577 M; 297/388

[56] References Cited

U.S. PATENT DOCUMENTS

| 3,486,712 | 12/1969 | Hoday | 242/107.7 |
| 3,490,715 | 1/1970 | Nicpon | 242/107.7 |
| 3,722,891 | 3/1973 | Hiller | 274/1 A |
| 4,002,311 | 1/1977 | Fisher et al. | 242/107.7 |

Primary Examiner—Harvey C. Hornsby
Assistant Examiner—John M. Jillions
Attorney, Agent, or Firm—Harness, Dickey & Pierce

[57] ABSTRACT

An improved safety belt tension eliminator which allows the wearer to ease the belt pressure on his body after the belt is attached. The control mechanism for the tension eliminator has an improved stop-follower mechanism which is uniquely spring mounted, adjusted and actuated.

14 Claims, 13 Drawing Figures

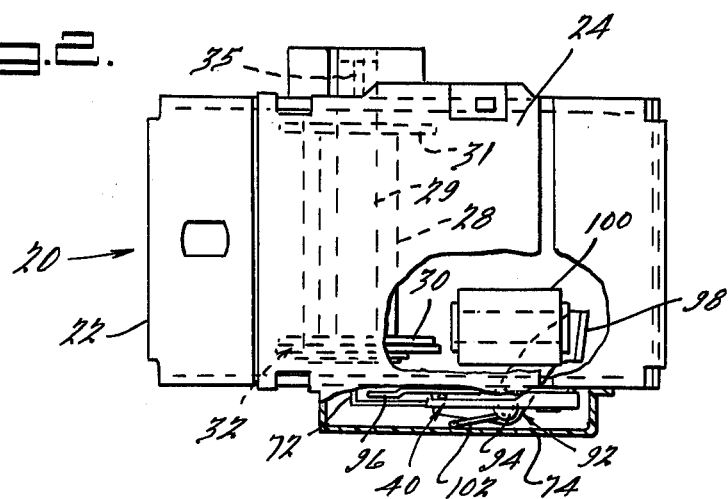
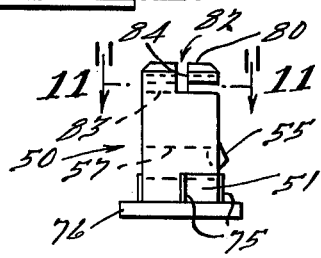
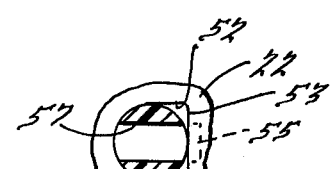
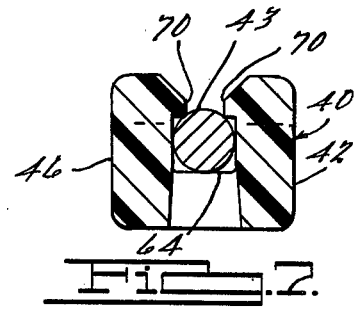
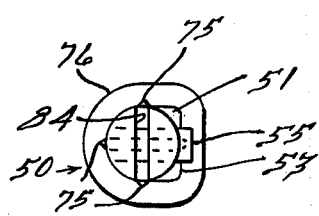
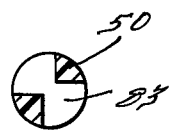
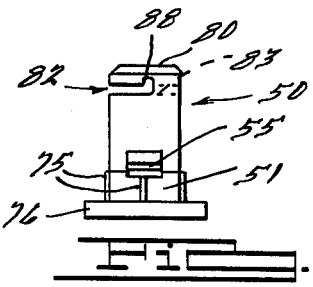
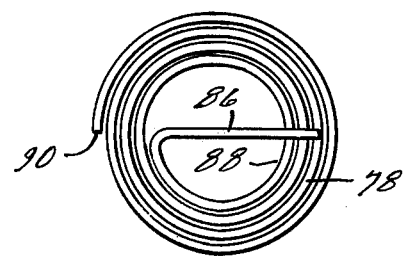
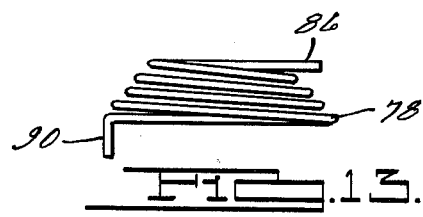

COMFORT LOCK MECHANISM

BACKGROUND—SUMMARY OF THE INVENTION

In typical safety belt systems, the belt is protracted by the wearer beyond the position required when set, the end or buckle is clamped, and the belt is allowed to retract and assert pressure against the wearer's body. The belt is also locked in the latter position against further protraction to secure the wearer in the seat in the event of a crash or sudden change in the movement of the vehicle. In these conventional systems, the pressure of the belt on the wearer and the resultant excessive confinement, produce uncomfortable effects not needed for safety.

A safety belt retractor which overcomes the latter problem and provides a belt position control mechanism which allows the wearer to ease the pressure of the belt on his body, is disclosed in U.S. Pat. No. 4,002,311. As disclosed in that patent, the wearer effects a slight protraction of the safety belt after it is initially buckled in position on his body. When the belt is then released, it assumes a position which is automatically locked against retraction and which relieves the pressure and tension of the belt on the wearer. The belt remains in that locked position until released by a conscious act of the wearer. Due to the pressure relieving effect of such retractor mechanisms, they are commonly called "comfort locks" or "tension relievers."

The results achieved by the device of U.S. Pat. No. 4,002,311 are accomplished by combining a control mechanism with one of the ratchet wheels of a conventional spring-activated reel-type retractor for a safety belt. The reel-type retractor preferably is of the type controlled by an electrical or inertia responsive device, both of which are well known in the art. In accordance with that patent, a plastic disc is attached to a ratchet wheel and has a plurality of grooves or tracks on its external face adapted to receive a spring follower and stop. The stop-follower rides or slides in and cooperates with the various contours of the tracks or races to effect control of the retractor reel. The precise operation of the control mechanism is described in detail in U.S. Pat. No. 4,002,311, the disclosure of which is hereby incorporated herein by reference.

The present invention is an improvement over the highly advantageous mechanism set forth in U.S. Pat. No. 4,002,311. In particular, the present invention relates to a new stop-follower device which has a unique and beneficial structure as well as a unique and beneficial mounting and biasing mechanism. The stop-follower comprises a bent wire rod which is secured to a plastic housing. The housing in turn is mounted on a pivot pin attached to the retractor, and the housing and pivot pin are spring biased together with a helical coil spring. The spring is attached to the pivot pin through a slot and groove configuration and is also adjustably secured to the housing. The bias of the stop-follower can be adjusted to allow the control mechanism to function in the best manner possible.

BRIEF DESCRIPTION OF THE DRAWINGS

FIG. 2 is a top view of the retractor shown in FIG. 1;

FIG. 6 is a cross-sectional view taken along the lines 6—6 in FIG. 5;

FIG. 7 is a cross-sectional view taken along the lines 7—7 in FIG. 4;

FIGS. 8 and 9 are side elevational views of the pivot pin for the present invention;

FIG. 10 is a top plan view of the pivot pin;

FIG. 11 is a cross-sectional view of the pivot pin taken along lines 11—11 in FIG. 8; and FIGS. 12 and 13 illustrate a spring used in the comfort lock mechanism.

DESCRIPTION OF THE PREFERRED EMBODIMENTS

Figure 1:
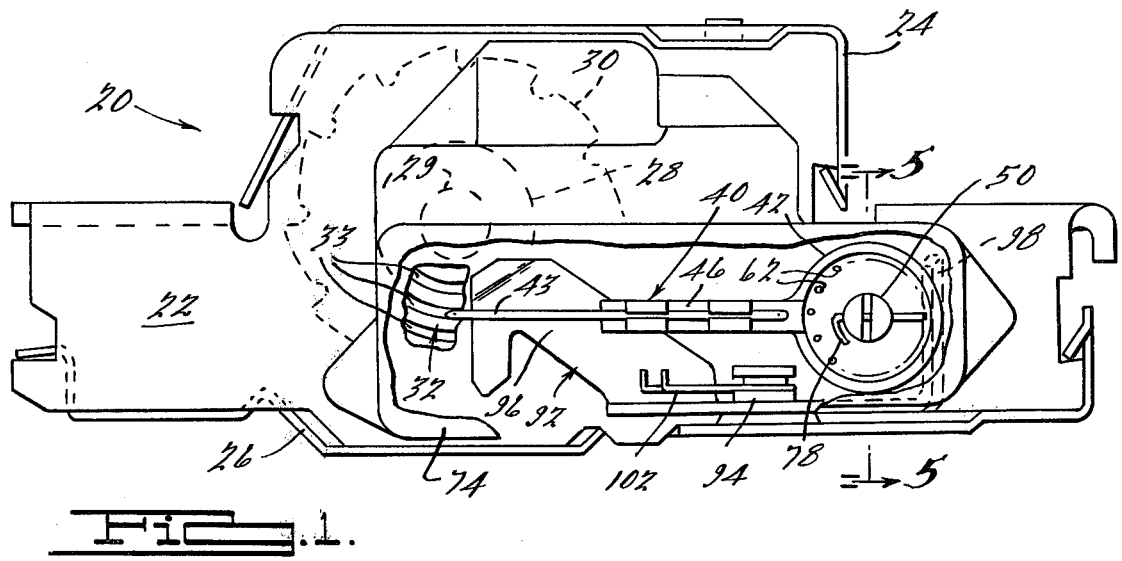
FIG. 1 is a side view of a safety belt retractor illustrating the present invention.
Figures 3, 5:
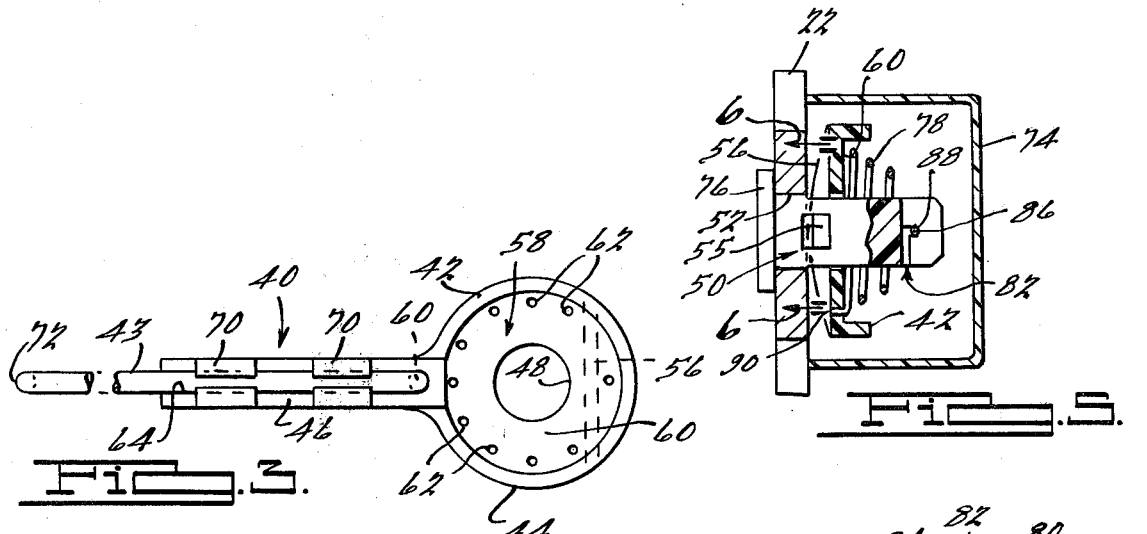
FIG. 3 is a plan view of one part of the comfort lock mechanism of the retractor.
FIG. 5 is a cross-sectional view of the retractor taken along the lines 5—5 in FIG. 1.
Figure 4:
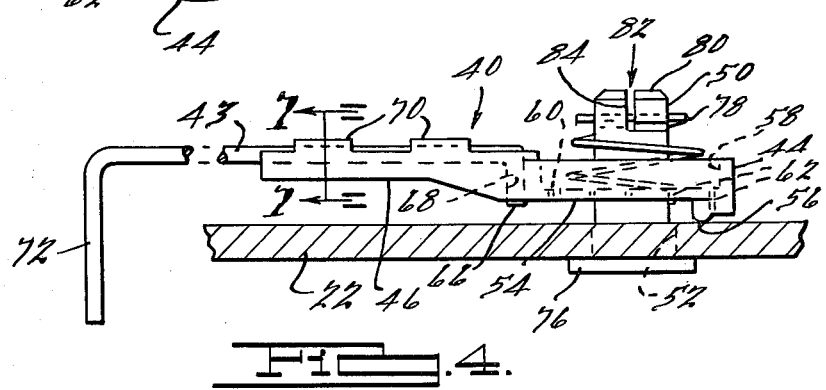
FIG. 4 is a partial side elevation view of one part of the comfort lock mechanism of the retractor.

A safety belt retractor incorporating the present invention is shown in FIGS. 1 and 2 and referred to generally by the numeral 20. The retractor 20 has an external frame or casing 22, an upper cover 24 and a lower cover 26 which protect the internal working mechanism. The retractor 20 is adapted to be mounted in a vehicle for use with a combination safety belt and harness sytem, as is well known in the art. A safety belt (not shown) is wound on a spool 28 in the housing and ratchet wheels 30, 31 are mounted on each end of the spool. The spool 28 is rotatably mounted on a central pin 29 and spring biased in the belt retraction direction by spring 35. Also, as is well known, such as that described in U.S. Pat. No. 3,667,698, the ratchet wheels 30, 31 are mounted in operative association with a pawl (not shown) which acts to operate to lock up the safety belt under certain conditions.

The control mechanism which is combined with the belt retractor includes a disc 32 which is formed of a suitable synthetic plastic and is molded to incorporate a plurality of track or racce configurations 33, as described in U.S. Pat. No. 4,002,311. The disc 32 is mounted on the outer face of the ratchet wheel 30 and rotates with it. The tracks 33 are each formed with a flat bottom and perpendicular side walls.

The control mechanism also includes a stop-follower, which is shown in more detail in FIGS. 3–5 and 7, and which is generally designated by the number 40. The stop-follower has a base or housing 42 and a projecting rod 43. The base 42 is molded or shaped preferably in the configuration shown and consists of a suitable synthetic plastic. The rod 43 is made of a small diameter metal wire, and preferably is stainless steel. The base 42 has a circular end 44 and an elongated cantilever arm 46. The circular end 44 has a central opening 48 for mating with a pivot pin 50, which will be described in more detail below. The end 44 has a bottom surface 54 with a raised rib 56 thereon and a recess 58 formed in its upper surface. The rib 56 is higher in the middle than its sides (see FIG. 5) in order to provide point contact on the retractor frame 22. The bottom surface 60 of the recess 58 has a plurality of holes 62 spaced relatively evenly on it in a circular pattern.

The arm 46 of the base 42 has an elongated groove 64 therein which mates with and holds one end of the rod 43. The inner end 66 of the rod 43 is bent approximately 90° and fits into an opening 68 on the base 42. Two pairs of snap-locks 70 are positioned on the upper surface of the arm 46 and hold the rod 43 securely in place. When the rod 43 and base 42 are assembled together to form the stop-follower, the rod 43 is forced downwardly between the halves of the snap-locks 70 and the end 66 is slid into the hole 68. In this manner the rod 43 and 42 are securely joined together and additional securing means, such as set screws or the like, are unnecessary.

The outer end 72 of the rod 43 is bent 90° and of sufficient length to project into the grooves or tracks 33 on the disc 32 when the control mechanism is mounted on the retractor 20. The diameter of the rod 43 is such that it will be received within and slidably engage the side walls of the tracks. When the stop-follower 40 is mounted on the retractor 20, as shown in FIG. 1, the end 72 of the arm 43 projects through a slot (not shown) in the casing 22 and into the tracks.

A cover 74 is positioned over the stop-follower 40 when it is mounted on the retractor 20. The cover 74 protects the control mechanism from damage during installation and use of the retractor, and also acts as a dust cover.

The pivot pin 50 is positioned through an opening 52 in the casing 22. An enlarged head 76 on the pin 50 prevents the pin from passing completely through the opening 52. To prevent rotation of the pin 50 relative to the retractor 20, one side of bottom portion 51 of the pin 50 is flat and mates with a corresponding flat side 53 in the hole in the casing 22. A plurality of minute projections 75 are positioned around the circumference of the lower portion 51 of the pin 50 to aid in press-fitting the pin 50 in the hole 52. A resilient projecting nob 55 is formed in one side of the pin 50. A cavity 57 is provided behind the nob 55 so that the nob 55 can be deflected out of the way when the pin 50 is inserted in the opening 52. After the nob 55 clears the opening 52 during assembly, it springs back to its initial position and locks the pin 50 in place on the frame 22.

The stop-follower 40 is slidingly mounted on the pivot pin 50 (FIGS. 4 and 5) and the fit is such that the stop-follower can be rotated freely around it. A conical helical coil spring 78, which is shown in detail in FIGS. 12 and 13, is attached near the end 80 of the pivot end 50 opposite the head 76. The spring 78 holds the stop-follower 40 in position on the retractor 20 and biases the end 72 of the stop-follower both into the tracks 33 on the disc 32 and radially inwardly toward the center of the spool 28. The conical spring 78 is quickly, easily, and securely fastened to the pin 50 without additional fastening means or devices by means of a slot and groove arrangement 82. Referring to FIGS. 8-11 in particular, the slot and groove arrangement 82 is cut and formed in the end 80 of the pin 50. One slot 84 opens downwardly from the end 80 and is in communication with a horizontal groove 83 which is shaped like an hour glass (FIG. 11). The slot 84 and groove 83 are adapted to receive the end 86 of the spring 78 which is straight and extends diametrically across the center opening 88 thereof. When the spring 78 is attached to the pin 50, the end 86 is slid down into the slot 84 and, when it reaches the bottom thereof, which is groove 83, rotated approximately 90°. This locks the spring 78 in place in the pin 50. To further insure that the spring will remain in place, an additional groove 88 is provided in the pin 50 adjacent the groove 82 and right angles to the slot 84. The bias of the helical spring 78 automatically forces end 86 into the groove 88 locking the spring in place.

The end 90 of the spring 78 opposite to that of diametrical end 86 is bent downwardly 90° from the bottom plane of the spring 78. The end 90 is positioned to fit into the holes 62 in the stop-follower 40. The diameter of the wire of the spring 78 is such that the end 90 will fit easily within the holes 62.

When the stop-follower 40 is mounted on the retractor, the end 72, which acts in combination with the disc 32 to lock up the retractor in a "comfort" position, will be biased toward the plane of the disc 32 (downwardly in FIG. 4) and also toward the center of the spool 28 (upwardly in FIG. 1). The off-set rib 56, in combination with the spring 78 acting on the pivot pin 50, acts to provide a lever force forcing end 72 downwardly into the tracks 33.

As indicated above, a plurality of circumferentially spaced holes 62 are provided on the stop-follower 40. When the upper end of the spring 78 is positioned and secured in place in the pivot pin 50, the tension and bias of the stop-follower can be adjusted by simply moving the end 90 from one hole 62 to another. Moving the end 90 one way around the series of holes will increase the bias of the spring 78, while moving the end 90 the other way will decrease the bias. The spring bias can be adjusted to change the action of the comfort retractor or to correct possible manufacturing tolerance problems in the bias of the spring 78 itself. The spring mounting of the stop-follower also provides a beneficial lost-motion action which increases its effectiveness.

When the stop-follower 40 is operably positioned as part of the retractor mechanism, it rests only on the end 72 of the rod 43 and the point contact made by the rib 56. The point contact reduces friction in the movement of the stop-follower 40 and allows it to move easily as it performs its tension relieving function in combination with the grooved disc 32.

The "comfort lock" can be released either manually or automatically. For manual release, the wearer protracts the belt further from the retractor 20 which rotates the disc 32 and causes the end of the stop-follower 40 to ride up a ramp (as described in detail in U.S. Pat. No. 4,002,311) and snap back radially inwardly to its rest or initial position adjacent the center of spool 28. When the stop-follower 40 is thus disengaged and at its initial position, the safety belt is free to be fully retracted.

The automatic release assures the return of the stop-follower 40 to its initial position from any position in the tracks. It can be set up to operate to release the comfort lock and allow retraction of the belt at the occurance of one or more events, for example, the belt is unlatched, or whenever the car door is opened. A preferred automatic release mechanism is illustrated in FIGS. 1 and 2. It comprises a spring biased magnetically responsive arm 92 which is pivotably mounted at pivot 94 and extends under the cantilevered end 43, 46 of the stop-follower 40. The stop-follower 40 is positioned in sliding engagement with one end 96 of the arm 92 and slides over it as the stop-follower 40 moves radially on the disc 32. The other end 98 of the magnetic arm 92 is generally in the form of a disc and is disposed adjacent the end of an electromagnet 100 supported on the inside of the retractor frame 22. The magnetic arm is spring biased by a light spring 102 which functions to space the disc portion 98 away from the magnet of the electromagnet and thus not allow the opposite end to place any pressure on the stop-follower 40. The electromagnet 100 is connected by a wire to a suitable electric source which is set to be automatically actuated under certain conditions, as indicated above. When the electromagnet 100 is actuated, it causes the magnetic arm 92 to pivot. This lifts and disengages the end 72 of the stop-follower 40 from the groove 33 in the disc 32 in which it is disposed, and allows the stop-follower 40 to snap back radially to its initial position. The spring actuated reel-type retractor then is free to automatically return the safety belt to its fully retracted position.

While specific embodiments of the invention have been illustrated and described, it is to be understood that these embodiments are provided by way of example only and that the invention is not to be construed as being limited thereto, but only by the scope of the following claims.

I claim:

1. A safety belt retractor comprising a frame and a spool mounted on said frame, bias means for biasing said spool in a belt retraction direction, said spool having an end flange combined with control means for locking said spool against retraction to relieve tension in said belt, said control means including a disc attached to said end flange for rotation therewith and having at least one track thereon, a stop-follower for mating with said track, said track adapted to receive said stop-follower positioned into said track and having means engagable by said stop-follower to prevent further retraction of said belt until released by the wearer, a spring for urging said stop-follower into said track and radially inwardly toward the center of said spool, and a pin for pivotably mounting said stop-follower on said frame, said spring having a first end connected to said pin and a second end connected to said stop follower.

2. The retractor as set forth in claim 1 wherein said stop-follower has a rib thereon which rests on said frame, said rib acting as a pivot about which said spring acts to bias the end of the stop-follower into said track.

3. The retractor as set forth in claim 1 wherein said stop-follower comprises a base with a cantilevered arm and an elongated rod, said elongated rod having one end positioned in said arm and extending therefrom and the opposite end disposed at an angle to its major length and receivable in said track during rotation of said disc.

4. The retractor as set forth in claim 1 wherein said second end of said spring is positioned in an aperature on said stop-follower.

5. The retractor as set forth in claim 4 wherein a plurality of aperatures are provided on said stop-follower, each of said aperatures adapted to receive said second end of said spring, whereby the tension of said spring and the resulting bias of said stop-follower are adjusted according to the aperture in which said second end is positioned.

6. The retractor as set forth in claim 1 wherein said first end of said spring is positioned in a slot and groove means on said pin.

7. The retractor as set forth in claim 6 wherein said groove means is substantially perpendicular to said slot and in communication therewith.

8. The retractor as set forth in claim 1 further comprising means for fixedly attaching said first end of said spring to said pin.

9. The retractor as set forth in claim 1 further comprising a movable release arm disposed under said stop-follower, and means to automatically activate said arm to raise the end of said stop-follower out of the track in which it is disposed, cause it to return to its initial positon, and permit full retraction of said belt.

10. A safety belt retractor comprising a frame and a spool mounted on said frame, bias means for biasing said spool in a belt retraction direction, said spool having an end flange combined with control means for locking said spool against retraction to relieve tension in said belt, said control means including a disc attached to said end flange for rotation therewith and having at least one track thereon, a stop-follower for mating with said track, said track adapted to receive said stop-follower positioned into said track and having means engagable by said stop-follower to prevent further retraction of said belt until released by the wearer, a spring for urging said stop-follower into said track and radially inwardly toward the center of said spool, and a pin for pivotably mounting said stop-follower on said frame, said spring having a first end removably attached to said pin and a second end removably connected to said stop-follower.

11. The retractor as set forth in claim 10 wherein said spring is attached to said pin by a slot and groove means, said slot and groove means releasably locking said spring to said pin.

12. The retractor as set forth in claim 10 wherein said stop-follower has a projection thereon which rests on said frame, said projection acting as a pivot about which said spring acts to bias the end of said stop-follower into said track.

13. The retractor as set forth in claim 10 wherein said stop-follower comprises a base with a cantilevered arm and an elongated rod, said elongated rod having one end positioned in said arm and extending therefrom and the opposite end disposed at an angle to its major length and receivable in said track during rotation of said disc.

14. The retractor as set forth in claim 10 further comprising a movable release arm disposed under said stop-follower, and means to automatically activate said arm to raise the end of said stop-follower out of the track in which it is disposed, cause it to return to its initial position, and permit full retraction of said belt.

* * * * *